United States Patent
Crocker et al.

(10) Patent No.: US 6,449,848 B1
(45) Date of Patent: Sep. 17, 2002

(54) FLEXIBLE FIXTURE METHOD

(75) Inventors: Robert B. Crocker, Buffalo; Kenneth Benczkowski, Cheektowaga, both of NY (US)

(73) Assignee: General Electro-Mechanical Corporation, West Seneca, NY (US)

( * ) Notice: Subject to any disclaimer, the term of this patent is extended or adjusted under 35 U.S.C. 154(b) by 0 days.

(21) Appl. No.: 10/004,986

(22) Filed: Dec. 5, 2001

Related U.S. Application Data

(62) Division of application No. 09/267,524, filed on Mar. 12, 1999.
(60) Provisional application No. 60/077,789, filed on Mar. 12, 1998.

(51) Int. Cl.⁷ .............................................. B21D 53/88
(52) U.S. Cl. ........................ 29/897.2; 29/559; 29/281.4; 29/281.5
(58) Field of Search .......................... 29/897.2, 897.31, 29/897.312, 897.32, 281.5, 281.4, 714, 464, 243.53, 524.1, 559, 448, 433, 33 K, 281.1, 281.6; 269/21, 266, 37, 296; 227/110, 111, 152, 154

(56) References Cited

U.S. PATENT DOCUMENTS

| | | | |
|---|---|---|---|
| 3,534,896 A | 10/1970 | Speller et al. | |
| 4,691,905 A | 9/1987 | Tamura et al. | |
| 4,894,903 A | 1/1990 | Woods | |
| 5,105,515 A | 4/1992 | Nelson | |
| 5,139,245 A | 8/1992 | Bruns et al. | |
| 5,249,785 A | 10/1993 | Nelson et al. | |
| 5,586,391 A | 12/1996 | Micale | |
| 5,604,974 A | 2/1997 | Roberts et al. | |
| 5,659,939 A | 8/1997 | Whitehouse | |
| 5,664,311 A | 9/1997 | Banks et al. | |

*Primary Examiner*—David P. Bryant
*Assistant Examiner*—T. Nguyen
(74) *Attorney, Agent, or Firm*—Hodgson Russ LLP

(57) ABSTRACT

A flexible fixture system and method wherein a single fixture system can accommodate and hold a plurality of different workpieces, i.e. the various workpieces comprising the different flight surfaces of a wing. The flexible fixture system comprises a plurality of posts each including a plurality of different contoured formers, one former for each of the different workpieces to be accommodated and held by the flexible fixture system. Depending upon which workpiece is to be held by the fixture system, the required former on each post is selected automatically and moved into position for operative association with the workpiece. The contoured formers include powered clamps for holding details to be fastened to the workpiece. Each post of the flexible fixture system also includes a plurality of holding devices, such as suction cup type devices, which are moved into position to hold the workpiece and maintain its curvature.

16 Claims, 10 Drawing Sheets

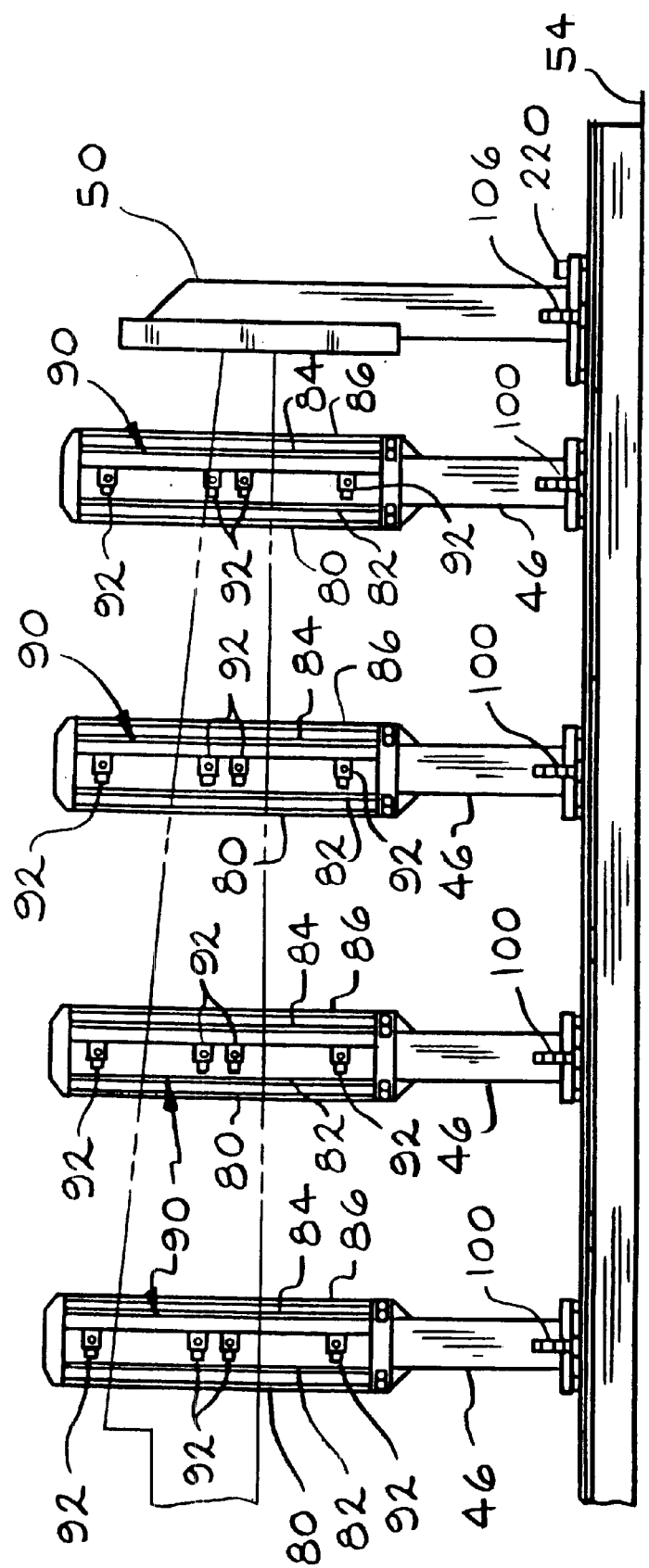

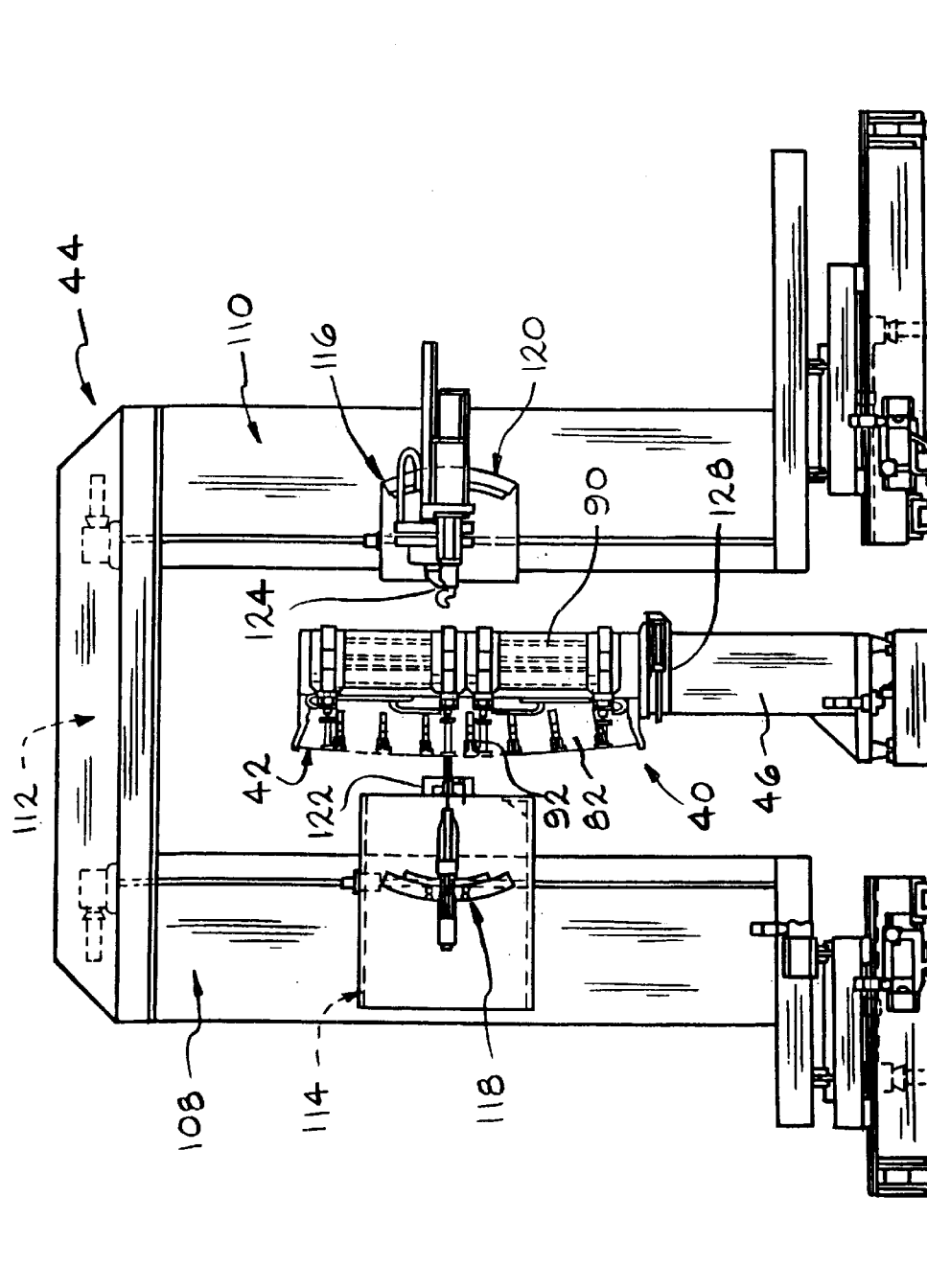

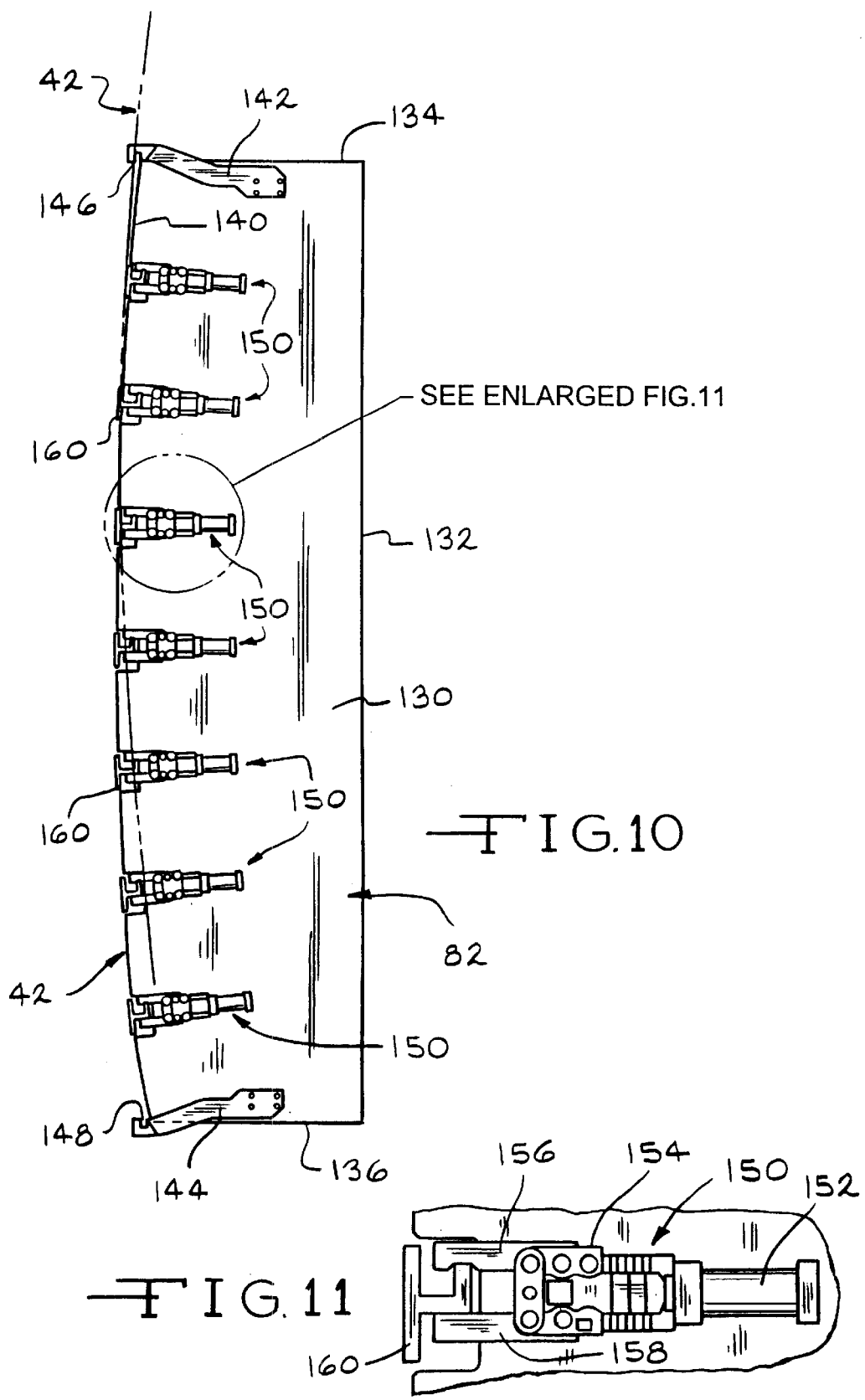

FLEXIBLE FIXTURE METHOD

CROSS REFERENCE TO RELATED APPLICATIONS

Applicants claim priority on U.S. Provisional Application No. 60/077,789 filed Mar. 12, 1998 entitled "Flexible Fixture System" which is incorporated herein by reference. Applicants claim priority on divisional U.S. patent application Ser. No. 09/267,524 issue entitled "Flexible System and Method" filed on Mar. 12, 1999 which is incorporated herein by reference.

BACKGROUND OF THE INVENTION

This invention relates generally to the art of automatic fastening, and more particularly to a new and improved flexible fixture system and method for supporting a workpiece during operation thereon by an automatic fastening machine.

One area of use of the present invention is a fixture for supporting wing panels during the fastening of stringers to the wing panel skin, although the principles of the invention can be variously applied.

Heretofore a dedicated fixture was employed for each different workpiece, for example a separate fixture was required to accommodate each of the specific, different flight surfaces of a wing.

SUMMARY OF THE INVENTION

Accordingly, it is an object of the present invention to provide a new and improved flexible fixture system and method wherein a single fixture system can accommodate and hold a plurality of different workpieces, i.e. the various workpieces comprising the different flight surfaces of a wing.

The present invention provides a flexible fixture system comprising a plurality of posts each including a plurality of different contoured formers, one former for each of the different workpieces to be accommodated and held by the flexible fixture system. Depending upon which workpiece is to be held by the fixture system, the required former on each post is selected automatically and moved into position for operative association with the workpiece. The contoured formers include powered clamps for holding details to be fastened to the workpiece. Each post of the flexible fixture system also includes a plurality of holding devices, such as suction cup type devices, which are moved into position to hold the workpiece and maintain its curvature.

The above and other objects, features and advantages of the present invention will become clearly apparent from the following detailed description of the preferred embodiment when read in conjunction with the accompanying drawings wherein the same reference numerals denote the same or similar parts throughout the several views.

BRIEF DESCRIPTION OF THE INVENTION

FIGS. 6–8 are enlarged fragmentary elevational views showing various portions of the arrangement of FIG. 4;

FIG. 9 is an enlarged end view showing the flexible, fixture system of FIGS. 4–8 in section and in relation to the automatic fastening machine;

FIG. 10 is an enlarged fragmentary elevational view of one of the contoured formers in the flexible fixture system of FIGS. 4–9;

FIG. 11 is an enlarged fragmentary elevational view showing one of the clamps in the former of FIG. 10;

DETAILED DESCRIPTION OF THE ILLUSTRATED EMBODIMENTS

Figures 1, 2:
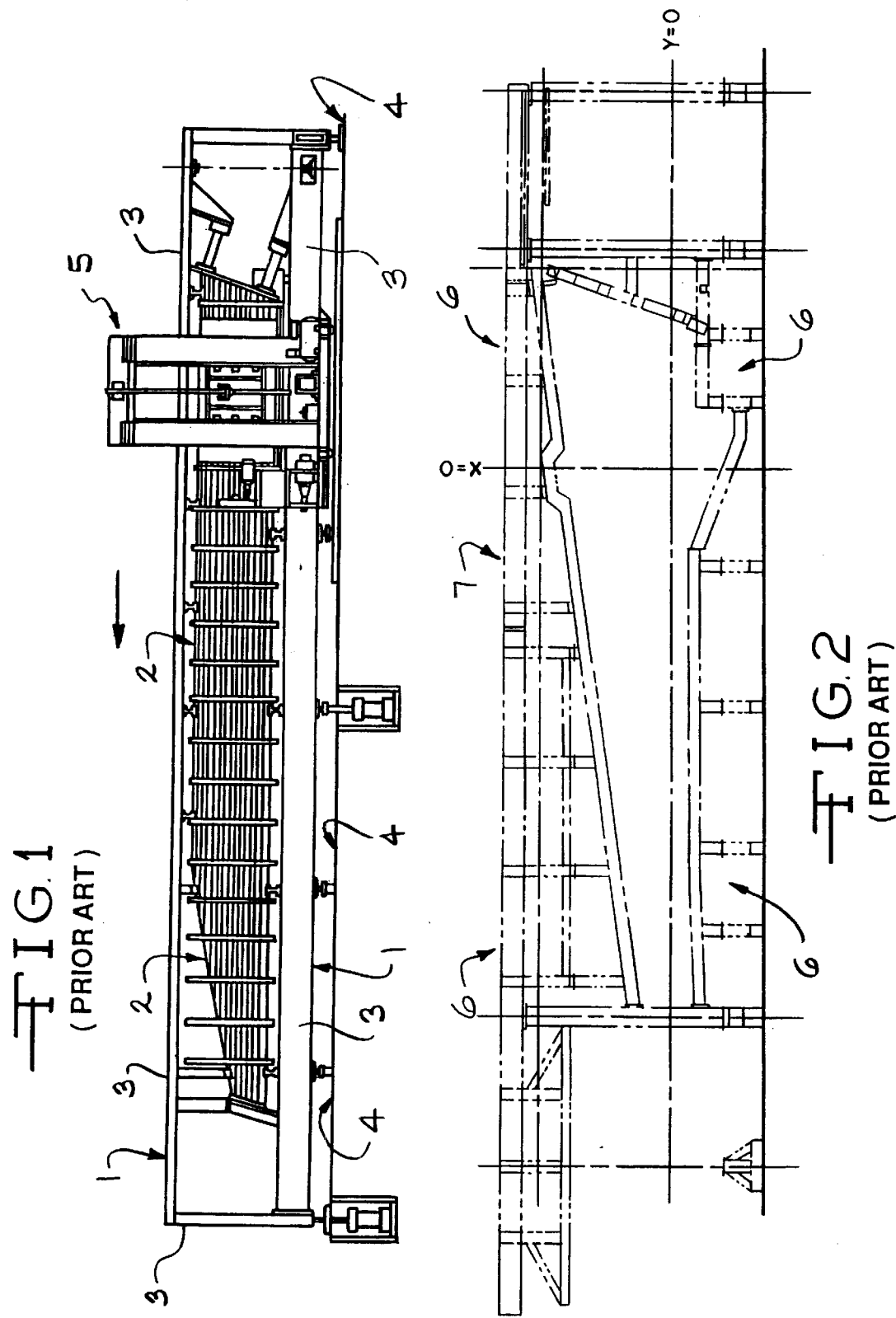
FIG. 1 is a side elevational view illustrating one form of prior art fixture for holding a workpiece during operation thereon by an automatic fastening machine.
FIG. 2 is a side elevational view of another form of prior art fixture.

One example of a prior art dedicated fixture 1 is shown in FIG. 1 which is similar to FIG. 1 of U.S. Pat. No. 4,864,702 issued Sep. 12, 1989, the disclosure of which is hereby incorporated by reference. A workpiece 2 is held in a frame 3 so as to be disposed substantially vertically relative to a horizontal supporting surface 4 such as the floor of a factory, and an automatic fastening machine 5 in straddling relation to the workpiece 2 moves longitudinally along workpiece 2 for installing fasteners therein. The fixture 1 of FIG. 1 was dedicated to a specific shape and contour of a workpiece necessitating an installation of different formers, headers and other structural components of the workpiece. Another example of a prior art dedicated fixture 6 is shown in FIG. 2 which is characterized by a massive upper fixture beam 7.

Figure 3:
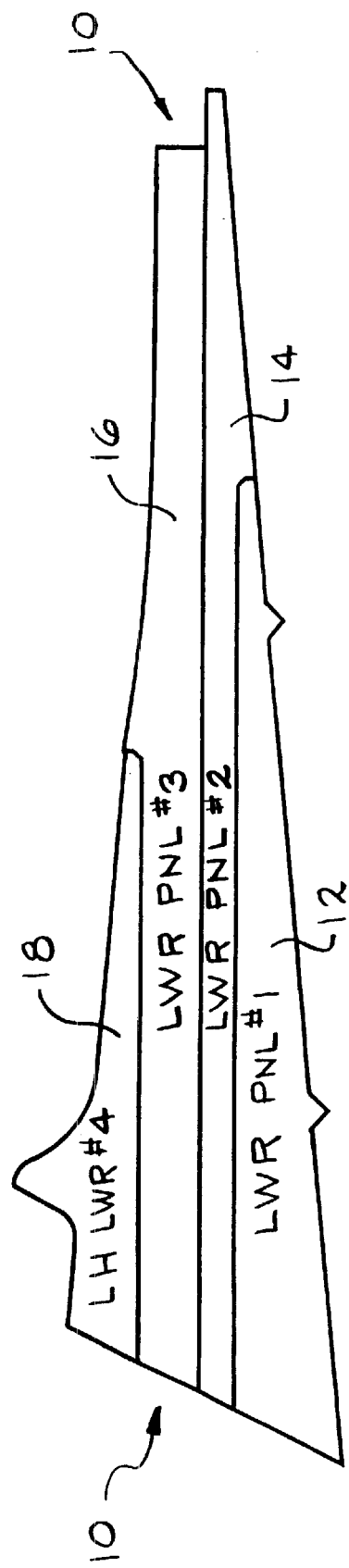
FIG. 3 is a side elevational view illustrating four specific flight surfaces of a wing panel as an example of different workpieces each of which can be held in the fixture of the present invention.

FIG. 3 illustrates the four specific flight surfaces of a particular wing generally designated 10, the flight surfaces being designated 12, 14, 16 and 18. The prior art fixturing approach, illustrated in FIGS. 1 and 2, would require constructing a different fixture configuration for each of the four panels 12–18 shown in FIG. 3 including manual changeover of the former boards for each of the wing panel sections illustrated in FIG. 3. The present invention provides a single flexible fixture system which accommodates a plurality of workpieces of different contours and shapes. In other words, the fixture system of the present invention will accommodate and hold each of the flight surface sections of the wings shown in FIG. 3 automatically without the need for reconstruction of any of the fixture system supporting structure or manual changeover of former boards. The flexible fixture system of the present invention includes a plurality of posts each including a plurality of different contoured formers, one former for each of the different workpieces. For example, in the illustrative workpiece of FIG. 3, each post would include four different contoured formers to accommodate each of the four flight surface sections in the wing of FIG. 3. However, the number of contoured formers included with each post can be more or less than four depending upon the range of workpiece sections to be accommodated. Depending upon which workpiece is to be held, i.e. which of the flight surfaces 12–18, the required former on each post is selected automatically and moved into position for operative association with the workpiece. The contoured formers include clamps or the equivalent for holding stringers to be fastened to the workpiece. Each post also includes a plurality of holding devices, for example in the form of suction or vacuum cups, which are moved into position to hold the workpiece and maintain its curvature.

Each of the flight surface sections 12–18 is an elongated workpiece having a longitudinal axis and having a surface which is curved along a path in a plane disposed substantially perpendicular to the workpiece longitudinal axis. Furthermore, a workpiece surface can have a compound curvature wherein different degrees of curvature exist at different locations along the workpiece longitudinal axis. In addition, the workpiece also can have a degree of curvature in a path extending in a direction along the workpiece longitudinal axis. The flexible fixture system of the present invention can be used with various types of workpieces, in addition to the wing flight surface sections shown in FIG. 3, and these other types of workpieces can have some or all of the curved surfaces described hereinabove. The workpieces, such as flight surface sections 12–18 or other curved workpieces, may be viewed as a family of workpieces wherein each member of the family has different degrees of curvature in the surfaces thereof.

Figure 4:
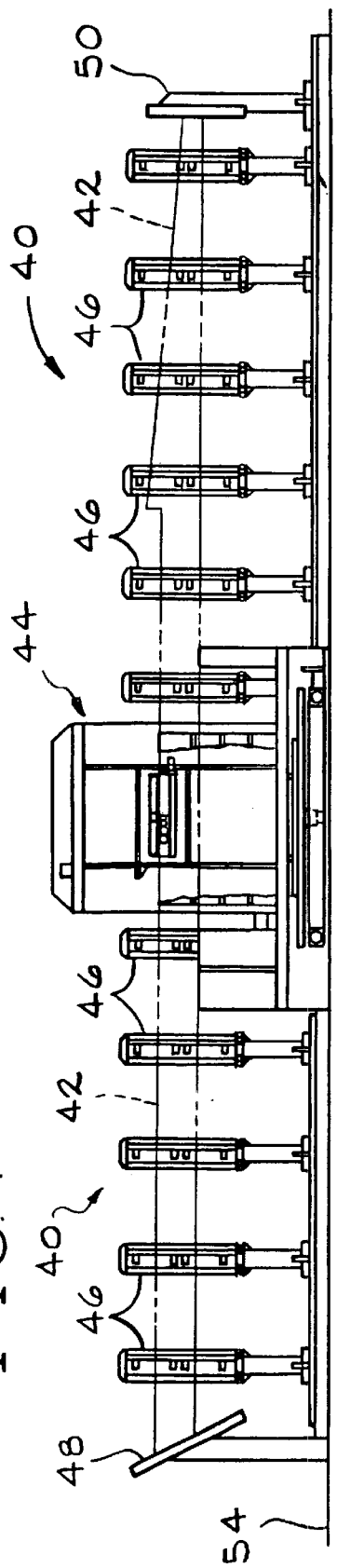
FIG. 4 is a side elevational view of the flexible fixture system according to the present invention as it would appear in use holding a workpiece in the form of a wing panel section during installation of fasteners thereon by an, automatic fastening machine.

Referring now to FIG. 4, the flexible fixture system 40 according to the present invention is shown as it would appear in use holding a workpiece 42 during operation thereon by an automatic fastening machine generally designated 44. An example of machine 44 is shown and described in the afore-mentioned U.S. Pat. No. 4,864,702. Fixture system 40 includes a plurality of posts 46 each including a plurality of formers and holding devices which will be described in detail presently. Workpiece 42 also is held in place by a fixed end gate 48 and a movable end gate 50. Fixture system 40 rests on a supporting surface 54 such as the floor of a factory, and machine 44 moves therealong typically from left to right as viewed in FIG. 4 to install fasteners such as rivets in the workpiece 42, this direction of movement of machine 44 being designated the X direction. Posts 46 of fixture system 40 also are movable individually in the X direction to provide access for machine 44 to install fasteners in workpiece 42 in a manner which will be described. As viewed in the drawings, the X axis is in a horizontal direction, substantially parallel to surface 54, and the Y axis is in a vertical direction, substantially perpendicular to surface 54.

Figure 5:
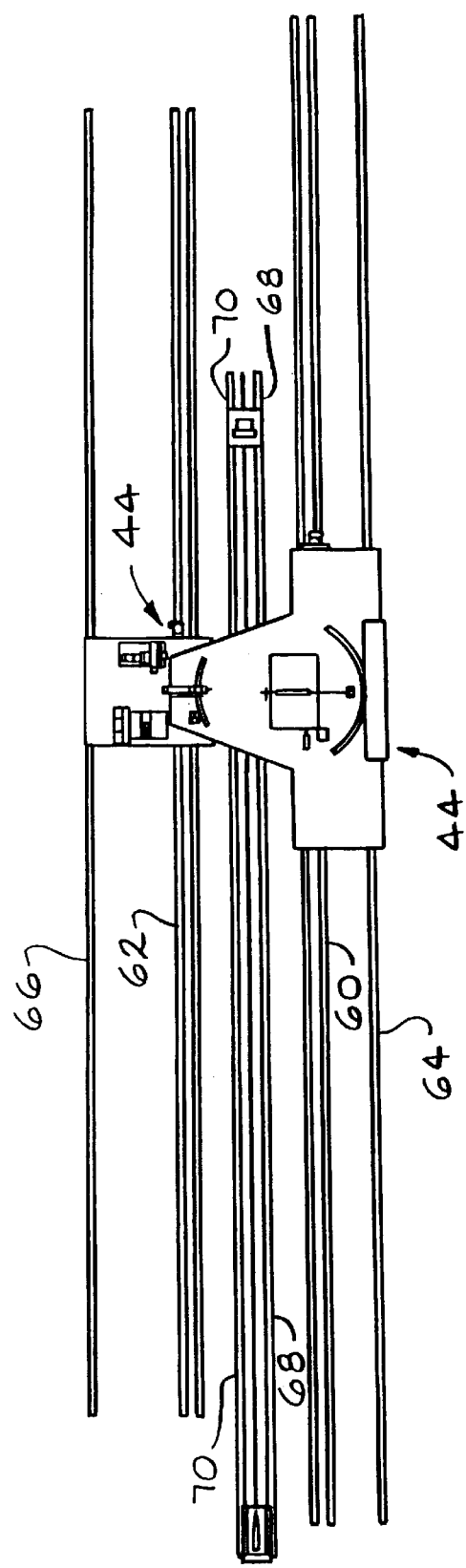
FIG. 5 is a top plan view of the arrangement of FIG. 4 with parts removed.

FIG. 5 is a top plan view of the arrangement of FIG. 4 with the fixture posts 46 removed for clarity of illustration. The automatic fastening machine 44 moves in the X direction by means of drive tracks 60 and 62 and guide tracks 64 and 66 in a known manner. Drive tracks 60,62 cooperate with a motor and gear on machine 44 in a rack and pinion type drive with the rack portion on either or both of the tracks 60, 62 as well known to those skilled in the art. Other drive arrangements can of course be employed. The fixture posts (not shown in FIG. 5), move along tracks 68,70 in the X direction, each to a limited degree, to allow machine 44 access to the workpiece for fastener installation operations.

Figure 6:
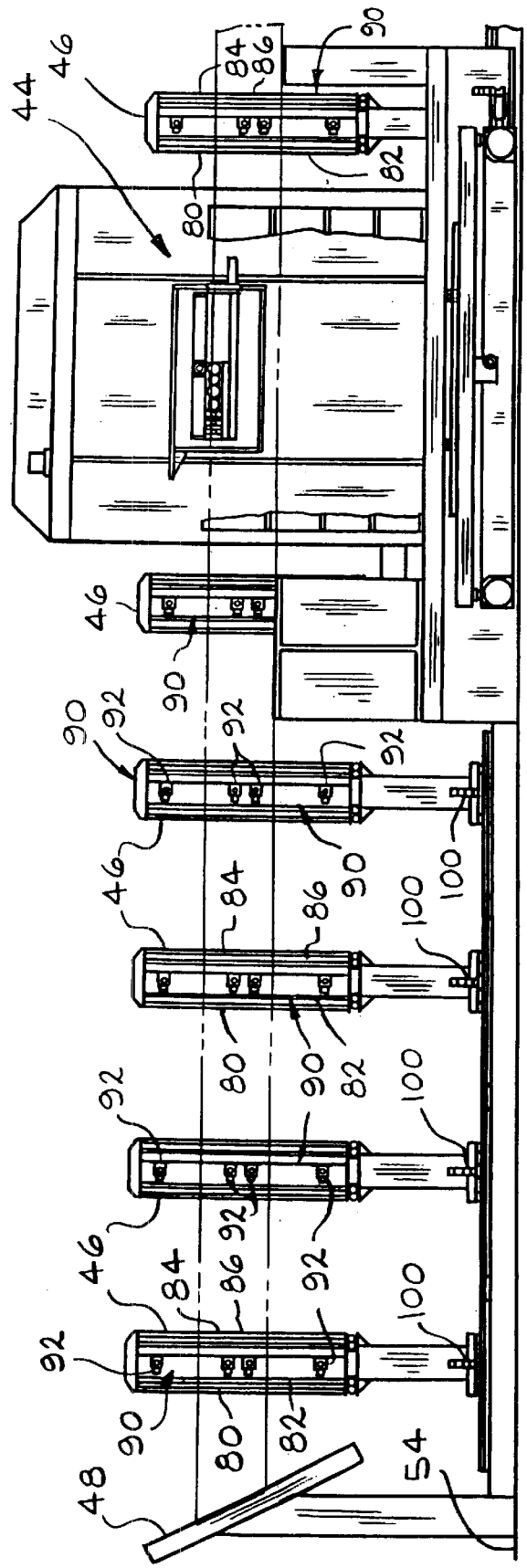
Figure 7:
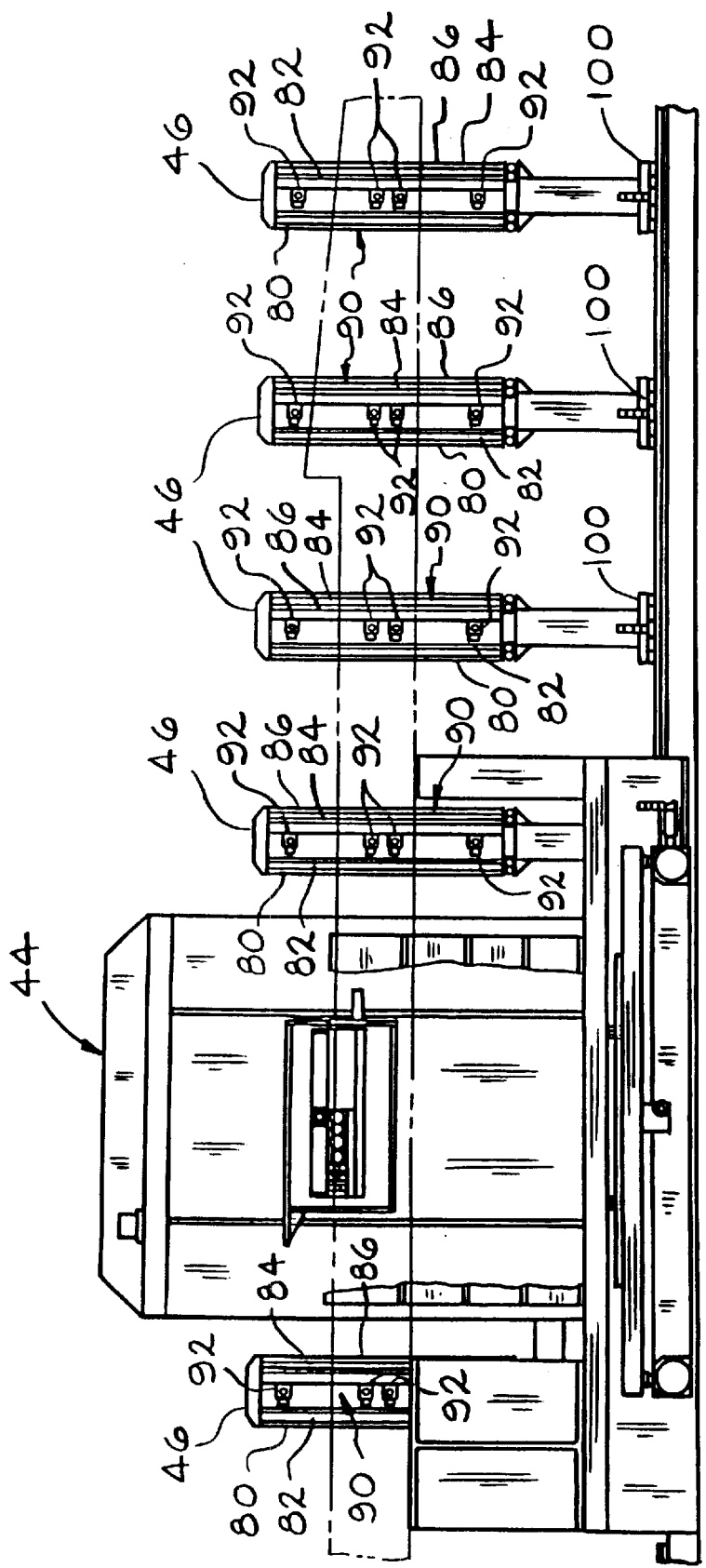

FIGS. 6–8 are enlarged portions of FIG. 4 to show the posts 46 in further detail, the automatic fastening machine 44 being shown also in FIGS. 6 and 7, the stationary end gate 48 being shown in FIG. 6 and the movable end gate 50 being shown in FIG. 8. Each post 46 includes a plurality of formers or contour boards, for example the four formers 80, 82, 84 and 86 shown in FIGS. 6–8. Formers 80 on each of the posts 46 are dedicated to one of the workpieces, for example the flight surface portion 12 shown in FIG. 3. The formers 80 are related to each other in having the varying contours required to support the workpiece to which they are dedicated, i.e. flight surface portion 12. Thus, the formers 80 taper and the contour varies along the X and Y axes. Similarly, formers 82 on each of the posts 46 are dedicated to another one of the workpieces, for example the flight surface portion 14 shown in FIG. 3. Formers 82 are related to each other in having the varying contours required to support the workpiece to which they are dedicated, i.e. flight surface portion 14. Formers 82 taper and the contour varies along the X and Y axes. In a similar manner, formers 84 on each of the posts 46 are related to each other and formers 86 likewise are related to each other, the formers 84 and 86 being dedicated to other workpieces, for example the flight surfaces 16 and 18 shown in FIG. 3. Each of the four formers 80, 82, 84 and 86 carries a plurality of clamps for holding components or details, for example wing panel stringers, in a manner which will be described. The formers 80–86 are individually selected and powered for movement into and out of operative position in a manner which will be described. While four formers 80–86 are shown, this is by way of illustration and the number of formers can vary depending upon the number of different workpieces in a family.

Each post 46 also includes an assembly generally designated 90 comprising a plurality of holding devices 92 for gripping the surface of the workpiece. Holders 92 can comprise vacuum or suction cup devices, and assembly 90 includes means for moving the holding devices 92 into and out of contact with the surface of the workpiece in the fixture system in a manner which will be described.

Each post 46 is provided with drive means generally designated 100 at the base thereof for operatively engaging the tracks 68, 70 for movement of each post in opposite directions along the X axis, i.e. left or right as viewed in FIGS. 6–8. The drive means 100 can comprise a motor driven pinion engaging rack teeth on either or both of the rails 68,70 in a manner well known to those skilled in the art. Drive means can be of other types known to those skilled in the art.

Similarly, movable end gate 50 is provided with drive means 106 at the base thereof for movement along the X axis and can comprise a motor driven pinion engaging rack teeth on either or both of guide rails 68, 70 in a manner well known to those skilled in the art.

Drive means 106 can be of other types known to those skilled in the art.

Automatic fastening machine 44 is shown in further detail in the end view of FIG. 9 and as it appears in relation to flexible fixture 40. Machine 44 has a pair of generally vertical frame portions 108, 110 which depend from an upper frame portion 112 and which depending portions 108 and 110 support vertically movable carriages 114 and 116, respectively, which contain positioners 118 and 120, respectively, operatively associated with heads 122 and 124, respectively. The heads contain tooling for performing operations as the workpiece 42 including drilling holes therein, inserting fasteners such as rivets or slugs and upsetting the fasteners. Heads 122, 124 move toward and away from workpiece 42 along paths generally parallel to the plane of the paper as viewed in FIG. 9. Riveting machine 44 thus is in straddling relation to workpiece 42 and flexible fixture 40 and moves along the X axis, i.e. perpendicular to the plane of the paper as viewed in FIG. 9. For a more detailed description of the structure and operation of a machine similar to automatic fastening machine 44, reference may be made to the above-mentioned U.S. Pat. No. 4,864,702.

FIG. 9 also shows one of the posts 46 of flexible fixture system 40 including one of the formers, for example former 82, carrying a plurality of clamps which will be described, operatively associated with workpiece 42 along with the assembly 90 comprising holding devices 92. During operation of flexible fixture system 40 only one of the formers on each of the posts 46 is moved into operative position adjacent workpiece 42. Thus, in the arrangement illustrated in FIG. 9, former 82 on each post 46 is moved into position, i.e. in a leftward direction as viewed in FIG. 9, for operative association with workpiece 42. The other formers, i.e. formers 80, 84 and 86 on each post 46 remain in a retracted position out of use. Movement of each former into and out of operative position is effected by motive means, such as a fluid cylinder or mechanical actuator, carried by post 46 and connected to each former. Appropriate guiding arrangements (not shown) such as linear bearings and tracks are provided on each former and post 46. An illustrative motive means carried by post 46 and connected to former 82 for moving the same in the foregoing manner is designated 128 in FIG. 9.

FIG. 10 shows in further detail one of the formers, for example former 82 of FIG. 9, which includes a body 130 having a side edge 132 and top and bottom edges 134 and 136, respectively, which meet side edge 132 at substantially right angles. Edge 132 is substantially planar and disposed generally vertically when former 82 is carried by post 46. Body 130 has another side edge 140 which is curved and faces toward workpiece 42. The curvature of the surface provided by edge 140 is selected to conform to the curvature of the particular workpiece that former 82 is selected for. In other words, curved edge surface 140 is dedicated or specific to the particular workpiece associated with former 82. Furthermore, the contours 140 of the plurality of formers 82 vary depending upon the portion of the surface of the workpiece the individual formers 82 come in operative contact with. In a similar manner, the curved edge surfaces of the other formers 80, 84 and 86 are dedicated or specific to the particular workpieces associated with those formers 80, 84 and 86.

A pair of dedicated fixed edge stop members 142 and 144 can be mounted on body 130 adjacent top and bottom edges 134 and 136, respectively. Stop members 142 and 144 are provided with notches or recesses 146 and 148, respectively, for receiving the top and bottom edges of workpiece 42.

A plurality of clamping devices each generally designated 150 are mounted on body 130 for holding details such as stringers which are to be fastened to workpiece 42. As shown in FIG. 11, each clamping device 150 can comprise a fluid cylinder or mechanical actuator 152 wherein the output rod or member thereof is coupled by a toggle mechanism 154 or the like to a pair of jaws or grippers 156 and 158 for releasably clamping a detail such as the stringer designated 160. In other words, linear movement of the rod or output member of cylinder/actuator 152 in one direction clamps jaws 156, 158 onto stringer 160 as shown in FIG. 11, and movement of the rod in the opposite direction releases the jaws. In the illustrative arrangement shown, seven clamping devices 150 are provided on body 130 for holding a corresponding number of details or stringers. The actual number of clamping devices 150 is a design parameter depending upon the nature and size of the workpiece and the type of details which are to be fastened thereto. Former 82 shown in FIGS. 10 and 11 is illustrative of each of the other formers 80, 84 and 86 on a post 46 and illustrative of all of the formers in the fixture shown in FIGS. 4–9.

Figure 12:
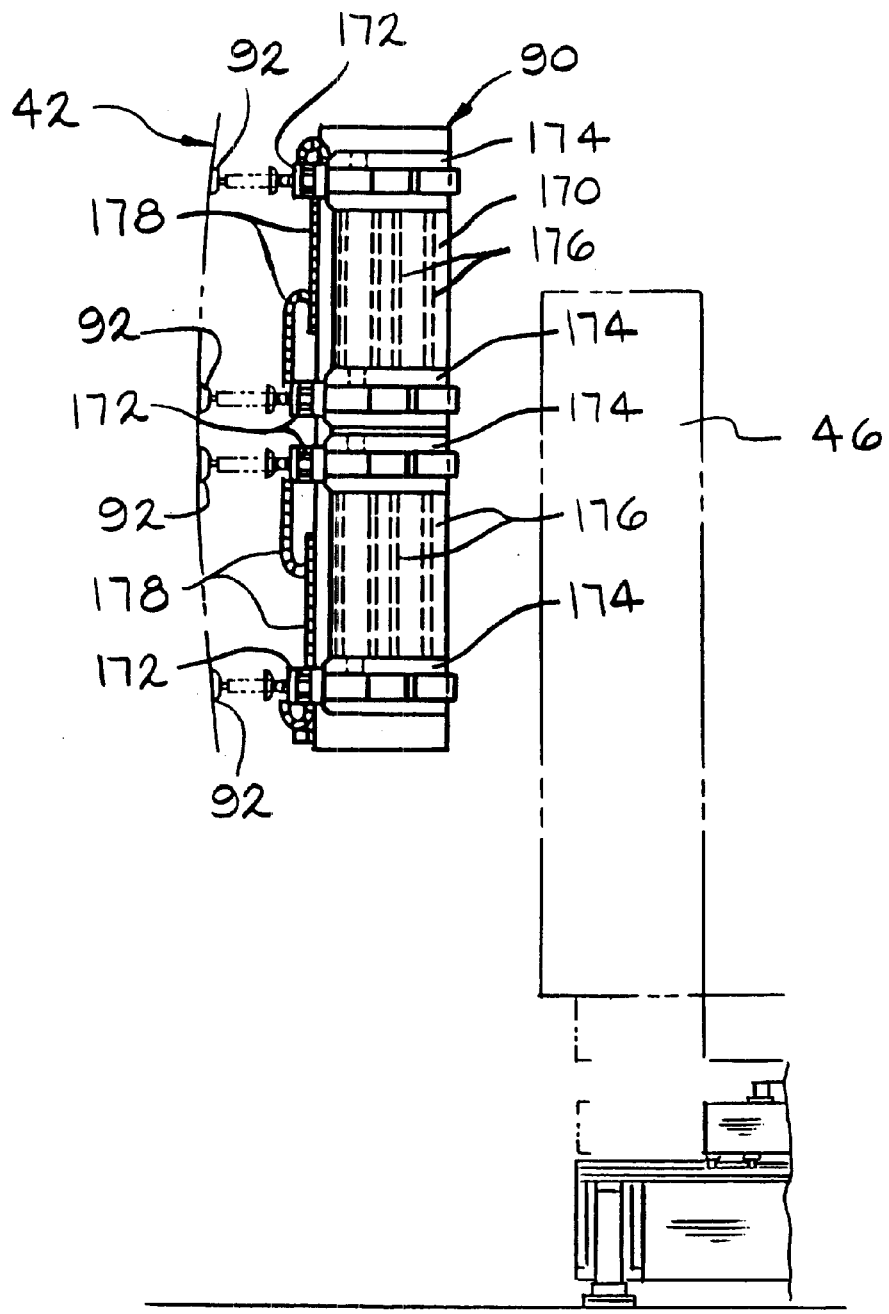
FIG. 12 is an enlarged fragmentary elevational view of one of the assemblies containing the workpiece holding devices in the fixture system of FIGS. 4–9.

FIG. 12 shows in further detail one of the assemblies of workpiece holding devices, for example assembly 90 of FIG. 9 which includes holding devices 92. Assembly 90 includes a housing or body 170 which is mounted by suitable means (not shown) on post 46. In the illustrative arrangement of FIG. 12, four devices in the form of suction cup devices 92 are shown, but the actual number is a matter of design choice depending upon the nature and size of workpiece 42. The vacuum or suction cup devices 92 are fluid or pneumatically operated so as to grasp the workpiece surface effectively and release it when necessary in a controlled manner. Such devices are readily commercially available and well-known to those skilled in the art. Each workpiece holding device 92 is moved into and out of contact with the surface of workpiece 42 by motive means 172 in the form of a fluid or air servo cylinder, electric servo or mechanical actuator. This movement is generally horizontal, in the plane of the paper, as viewed in FIG. 12. Each motive means 172, in turn, is supported in a carriage 174 which is movable lengthwise along body 170, i.e. generally vertically as viewed in FIG. 12. In particular, the carriages 174 are guided along tracks 176 and movement is effected by suitable means such as a rack and pinion drive where servo motors (not shown) on carriages 174 drive pinions which engage rack teeth along or associated with the tracks 176. Certain ones of the actuators 172 are coupled by link members 178. Thus, by virtue of this arrangement, the holding devices 92 can be moved selectively generally vertically as viewed in FIG. 12 to reach the appropriate locations along the curved surface of workpiece 42. While suction or vacuum cups 92 are shown in the present illustration, holding devices 92 can be other devices which contact and hold the surface of workpiece in a manner which does not damage the workpiece and which serve to maintain or hold the curvature of the workpiece. As a further alternative, straps could be employed extending from the top 134 and bottom 136 edges of the formers and over the workpiece to hold it against the formers. While adding to the complexity of the fixture system, a further alternative could be mating or cooperating former boards on the opposite surface of the workpiece to hold it against the formers.

Figure 13:
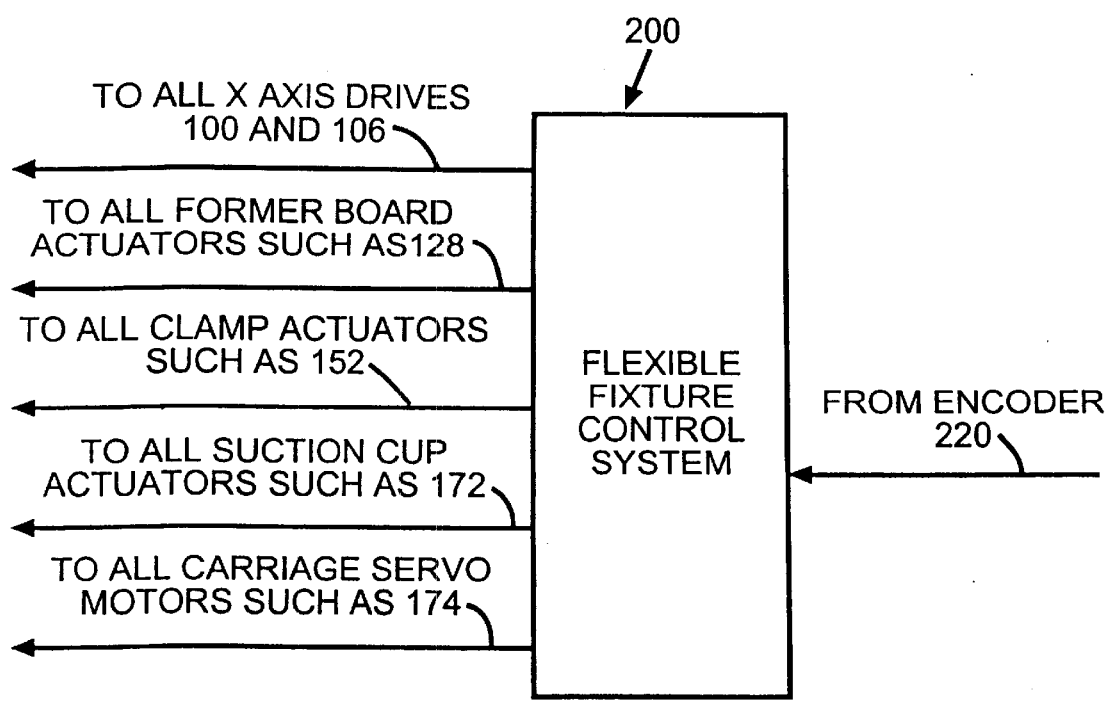
FIG. 13 is a block diagram illustrating the control system for the flexible fixture system of FIGS. 4–12.

A control system 200 shown diagrammatically in FIG. 13 is connected in controlled relation to the X axis drive means 100 and 106 on all of the posts 46 and on movable end gate 50, respectively, to all the actuators for moving the former boards such as actuator 128 associated with board 82, to all the actuators for the former board clamping devices such as actuator 152, to all the actuators for the suction cup devices such as actuator 172 and to all of the servo motors for operating the carriages such as carriages 174 to provide programmed control of the operation of flexible fixture 40. Control system 200 can be a Delta-Tau motion controller including cards integrated in a personal computer with color graphic HMI interface. For a more detailed description of such a motion control for use with automatic fastening machines, reference may be made to pending U.S. patent application Ser. No. 08/937,979 filed Sep. 26, 1997 entitled "Control System For Automatic Fastening Machines", the disclosure of which is hereby incorporated by reference.

Thus, a single flexible fixture system 40 according to the present invention actually provides a plurality of individual fixtures in the same apparatus, in the present illustration four individual fixtures provided by the four different former boards 80, 82, 84 and 86 on each post 46. In the illustrative flexible fixture system 40 shown and described herein, each fixture provided by the different former boards 80, 82, 84 and 86 will accommodate a specific flight surface of the wing shown in FIG. 3 (upper left/right, lower left/right) comprising the four individual panels. The fixture system may be reconfigured for other workpieces by changing the former boards.

A significant advantage of the fixture system 40 according to the present invention is elimination of the upper beam of prior art fixtures such as that shown in FIG. 2 by providing the mobile vertical columns or posts 46 which store and shuttle the plurality of former boards 80–86 into position via programmed control. Valuable production time is not lost in manual former board changeover, in contrast to prior art fixtures. In particular, eliminating the upper beam of fixtures like that shown in FIG. 2 reduces the overall fixture height and the riveter overall height. The sets of former boards (per fixture system) necessary for riveting a complete wing, for example, (upper or lower, left or right panel) remain intact during the fastening process. There is no time lost to changeout former boards or to store former boards when changing from panel to panel. Board combinations are selected from the operator console. Stringers are located without tack fasteners utilizing the powered clamps 150 on the former boards 80–86.

The fixture design is reconfigurable through changeout of headers to accommodate other wing panel assemblies from other models. Skin panel clamping and maintenance of panel contour is accomplished using the is powered edge clamps 142, 144 and vacuum cups 92 on the former boards. The configuration has integrated machine/fixture compensation for temperature variation and fastening process induced growth.

In summary, the flexible fixture system 40 is fully automated and programmable, comprising the following. An "X" axis bed can be provided on floor 54 for alignment and mounting of the fixed end gate 48 movable end gate 50; and mobile columns 46. The fixed end gate 48 can be provided with interchangeable body side tooling.

Each mobile post or column 46 is NSK linear way mounted for "X" motion powered by an electric servo drive 100. This drive medium allows for infinitely variable positioning within the confines of the "X" travel range. Columns 46 required to support a specific panel are indexed into position, for example at four foot intervals, nominal. Those columns not required are driven to a "rest" position. Up to four former boards are attached to each column 46 in the system illustrated herein. Each former board required for a specific panel will extend in the "Z" direction i.e. perpendicular to the X direction, to support the panel and locate stringers. If necessary, for workpieces having curvature in a direction along the longitudinal axis thereof, the formers can be moved by different amounts in the Z direction to accommodate such curvature. The former board includes all powered clamping devices 150 to locate stringers. Clamp design creates positive location in the YZ plane while allowing for panel growth along the "X" axis.

The clamps 142, 144 and 150 will auto disengage, the former board will retract, and index in the "X" direction to allow the automatic fastening machine 44 access to the original former board location.

Two former boards are located on each side of the column. The set of former boards is bisected by the assembly 90 of vacuum cups 92 centrally positioned on the column. Up to four vacuum cups 92 which are independently driven in the "Y" (vertical) direction are mounted to each column in the system illustrated herein. The position and combination of vacuum cups 92 to be utilized on any specific panel is programmed variable. Each of the four vacuum heads 92, approximately 3" diameter, will provide 40 degrees of gimbal and apply a LI; vacuum load of approximately 50 lbs. Powered clamps 142, 144 are utilized at the upper and lower extremities of each former board to locate the workpiece panel at elevation. These clamps are power disengaged to allow retraction of a former for access by the machine.

The mobile endgate 50 is moved into position to clamp the outboard panel end and zeroed in the control. Growth due to temperature variation or induced by the fastening process translates to movement of this endgate which will register on a precision linear encoder 220 shown in FIG. 8. This output may be utilized to adaptively adjust fastener placement in the "X" direction.

It is to be understood that various changes in the details, materials, steps and arrangements of parts, which have been herein described and illustrated in order to describe the nature of the invention, may be made by those skilled in the art within the principles and scope of the present invention. While an embodiment of the present invention has been described in detail, that has been done for the purpose of illustration, not limitation.

What is claimed is:

1. A flexible fixturing method for holding individual workpieces during operations performed thereon wherein the workpieces are selected from a family of workpieces, each workpiece in the family being elongated having a longitudinal axis and having a surface curved along a path in a plane substantially perpendicular to the longitudinal axis, the method comprising:

a) providing a plurality of posts at spaced locations along a supporting surface in a first direction extending substantially parallel to the supporting surface;

b) providing a plurality of contoured formers on each post;

c) dedicating one former to each workpiece in the family of workpieces so that the formers have varied contours required to support the workpiece to which they are dedicated, the contours varying depending upon the portion of the workpiece surface which the formers are to be operatively associated with wherein one former is individually selected and individually powered so as to be moved into and out of operative position with the workpiece to which it is dedicated, while at the same time, the remaining plurality of contoured forrners carried by the post remain in a retracted position and out of use;

d) disposing the selected individual workpiece so that the longitudinal axis thereof is disposed substantially parallel to the first direction and so that the curved surface of the workpiece faces the contoured formers;

e) moving each of the formers into operative association with the curved surface of the workpiece;

f) selectively operating the drive means corresponding to the formers dedicated to the selected workpiece; and g) holding the workpiece in place against the contoured farmers.

2. The method according to claim 1, wherein the step of holding the workpiece includes maintaining the curvature of the workpiece.

3. The method according to claim 1, further including holding details to be fastened to the workpiece.

4. The method according to claim 1, further including moving an automatic fastening machine along the first direction and moving tooling carried by the machine toward and away from the workpiece for fastening the details to the workpiece.

5. The method according to claim 4, further comprising the act of moving an automatic fastening machine along the first direction and moving tooling carried by the machine toward and away from the work piece, wherein the tooling is for performing operations on the work piece and comprises: drilling the work piece and defining holes in the work piece, inserting fasteners in the holes defined in the work piece, and upsetting the fasteners.

6. A method for holding a work piece during operations performed thereon wherein the work piece is selected from a family of work pieces, each work piece in the family being elongated having a longitudinal axis and having a surface curved along a path in a plane substantially perpendicular to the longitudinal axis, the method comprising the acts of:

a) providing a plurality of posts at spaced locations along a supporting surface in a first direction extending substantially parallel to the supporting surface;

b) providing a plurality of contoured formers carried by each post, there being one former dedicated to each work piece in the family of work pieces, the formers having varied contours required to support the work piece to which they are dedicated, the contours varying depending upon the portion of the work piece surface which the formers are to be operatively associated with wherein one former is individually selected and individually powered so as to be moved into and out of operative position with the workpiece to which it is dedicated, while at the same time, the remaining plurality of contoured formers carried by the post remain in a retracted position and out of use;

c) disposing the work piece so the longitudinal axis thereof is disposed substantially parallel to the first direction and so that the curved surface of the work piece faces the contoured formers;

d) moving each of the formers into operative association with the curved surface of the work piece;

e) providing a controller control the movement of the formers dedicated to the selected work piece;

f) holding the work piece in place against the contoured formers; and g) providing tooling for working the work piece while holding the work piece against the contoured formers.

7. The method of claim 6 wherein the act of holding the work piece further comprising the act of providing members on the formers for engaging opposite side edges of the work piece.

8. The method according to claim 6 further comprising the act of holding the work piece with a suction cup for releasable grasping the work piece surface.

9. The method of claim 8 wherein the suction cup is carried by the post.

10. The method according to claim 9, further comprising a step of moving the suction cup in a direction substantially perpendicular to the first direction.

11. The method of claim 6 further comprising the acts of providing the formers with clamps for, the clamps for holding details to be fastened to the work piece.

12. The method according to claim 6 wherein the tooling is for performing operations on the work piece comprising: drilling the work piece and defining holes in the work piece, inserting fasteners in the holes defined in the work piece, and upsetting the fasteners.

13. The method according to claim 6 further comprising the acts of providing a pair of end gates for contacting and holding opposite ends of the work piece.

14. The method of claim 11 further comprising the acts of providing a means for driving one of the end gates to accommodate changes in the length of the work piece, and providing a means for encoding on the movable end gate for monitoring movement thereof.

15. A flexible fixture method for holding individual work pieces during operations performed thereon wherein the work pieces are selected from a family of work pieces, each work piece in the family being elongated having a longitudinal axis and having a surface curved along a path in a plane substantially perpendicular to the longitudinal axis, the method comprising:

a) providing a plurality of posts at spaced locations along a supporting surface in a first direction substantially parallel to the supporting surface;

b) providing a plurality of contoured formers on each post, dedicating one of the contoured formers to one of the plurality of the work pieces in the family of work pieces, and providing the plurality of formers with varied contours for supporting the work piece to which they are dedicated, and providing the varied contours to correspond with the surface which the formers are to be operatively associated with;

c) providing one former to be individually selectable and power able so as to be movable into and out of operative position with the work piece to which it is dedicated, while at the same time, the remaining plurality of contoured formers carried by the post remain in a retracted position and out of use;

d) disposing the selected individual work piece so that the longitudinal axis thereof is disposed substantially parallel to the first direction and so that the curved surface of the work piece faces the contoured formers;

e) moving each of the formers into operative association with the curved surface of the work piece;

f) selectively operating the drive means corresponding to the formers dedicated to the selected work piece;

g) holding the work piece in place against the contoured formers; and h) providing an automatic fastening machine having a frame movable along the supporting surface along the first direction and having heads carrying tooling supported by the frame and located on opposite sides of the work piece, the heads being movable toward and away from the work piece.

16. The method according to claim 15 wherein the tooling is for performing operations on the work piece comprising: drilling the work piece and defining holes in the work piece, inserting fasteners in the holes defined in the work piece, and upsetting the fasteners.

* * * * *